UNITED STATES PATENT OFFICE.

EDWARD ALBERT VOGT, OF FRIEDHEIM, MISSOURI.

HAIR DYE AND TONIC.

SPECIFICATION forming part of Letters Patent No. 406,071, dated July 2, 1889.

Application filed March 16, 1889. Serial No. 303,590. (No specimens.)

*To all whom it may concern:*

Be it known that I, EDWARD ALBERT VOGT, a citizen of the United States, residing at Friedheim, in the county of Cape Girardeau and State of Missouri, have invented certain new and useful Improvements in Hair Dyes and Invigorators; and I do declare the following to be a full, clear, and exact description of the invention, such as will enable others skilled in the art to which it appertains to make and use the same.

The special object of my invention is to make a hair-wash which will dye the hair a deep brown color, promote its growth, and prevent it from falling out. This I accomplish without the use of any ingredient calculated to do harm in any way.

I first prepare a fluid extract of the green or unripe walnut by putting the finely-cut fruit in a percolator and moistening it with one part of glycerine and two parts of alcohol. This is allowed to macerate for twenty-four hours. I use this mixture as a menstruum, letting it percolate until I get an ounce of the fluid extract for each ounce of unripe walnuts. This forms the coloring-matter for the hair. I then obtain by like means and in a similar manner the fluid extract of fresh burdock-root, which promotes the growth of the hair. This is mixed with the walnut extract. The third ingredient is the glycerole of Spanish pepper, which I obtain as follows: I mix half an ounce of the powdered red pepper with half an ounce of ether and three ounces of glycerine, which is permitted to macerate for twenty-four hours. I then add one ounce of alcohol, and filter. The filtrate is then placed on a water bath and allowed to remain until the ether has evaporated. This is found to slightly stimulate the roots of the hair, prevent it from falling out, and promote its growth. Before mixing this with the extracts of the walnut and burdock-root I distill from the latter as much alcohol as will reduce the compound extract to one-half its weight, and then mix the remainder with the glycerole. Oil of roses or equivalent may be added to give a pleasant odor.

The proportions of the essential ingredients of my composition of matter are: fluid extract of green walnut, two ounces; fluid extract of burdock-root, one ounce; glycerole of red pepper, one-half ounce.

In order to use my hair-wash, which both colors and invigorates the hair, moisten a little rag or sponge and rub the scalp and hair thoroughly until the hair is dyed a deep brown. This will take some time if exposed to the light; but after several days it need be done only twice a week. White hair will become a lustrous brown and be caused to grow with renewed vigor. If the hands are washed after applying the wash, they will not be stained or soiled.

Having thus described all that is necessary to a full understanding of my invention, what I claim as new, and desire to protect by Letters Patent, is—

A compound hair dye and invigorator, consisting of the fluid extracts of green or unripe walnuts and fresh burdock-roots mixed with glycerole of Spanish pepper, in about the proportions set forth.

In testimony whereof I affix my signature in presence of two witnesses.

EDWARD ALBERT VOGT.

Witnesses:
 N. C. HARRISON,
 R. T. HENDERSON.